United States Patent
Bruns et al.

(10) Patent No.: US 10,843,966 B2
(45) Date of Patent: *Nov. 24, 2020

(54) SYSTEM AND METHOD FOR GENERATING TIRE RUBBER ASPHALT

(71) Applicant: ASPHALT SCIENCES, LLC, Reno, NV (US)

(72) Inventors: Joseph Randall Bruns, Reno, NV (US); Hashem Hashemi, Reno, NV (US)

(73) Assignee: ASPHALT SCIENCES LLC, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/255,804

(22) Filed: Jan. 23, 2019

(65) Prior Publication Data

US 2019/0389769 A1   Dec. 26, 2019

Related U.S. Application Data

(63) Continuation-in-part of application No. 15/283,821, filed on Oct. 3, 2016, now Pat. No. 10,214,617.

(60) Provisional application No. 62/661,609, filed on Apr. 23, 2018, provisional application No. 62/236,861, filed on Oct. 3, 2015.

(51) Int. Cl.
| | |
|---|---|
| *C04B 26/26* | (2006.01) |
| *C04B 18/22* | (2006.01) |
| *C04B 20/04* | (2006.01) |
| *C08J 11/08* | (2006.01) |

(52) U.S. Cl.
CPC .............. *C04B 26/26* (2013.01); *C04B 18/22* (2013.01); *C04B 20/04* (2013.01); *C08J 11/08* (2013.01); *C08J 2321/00* (2013.01)

(58) Field of Classification Search
CPC .... C08L 95/00; C08L 95/005; C08L 2555/80; C08L 2555/82; C08L 2555/84; C08L 2555/86; C08L 2555/34
See application file for complete search history.

(56) References Cited

U.S. PATENT DOCUMENTS

| | | |
|---|---|---|
| 4,068,023 A | 1/1978 | Nielsen |
| 4,609,696 A | 9/1986 | Wilkes |
| 5,334,641 A | 8/1994 | Rouse |
| 5,492,561 A | 2/1996 | Flanigan |
| 5,683,498 A | 11/1997 | Hesp |
| 10,214,617 B1 | 2/2019 | Bruns |
| 2011/0196074 A1 * | 8/2011 | Flanigan ............. C08J 3/005 524/71 |
| 2016/0272778 A1 | 9/2016 | Yuan |

FOREIGN PATENT DOCUMENTS

KR    1239399 A    3/2013

OTHER PUBLICATIONS

ISA/US, International Search Report and Written Opinion for PCT/US19/19033 dated Apr. 29, 2019, 15 pages.

* cited by examiner

*Primary Examiner* — Christopher M Rodd
(74) *Attorney, Agent, or Firm* — Kerr IP Group, LLC (57) ABSTRACT

A method and system for generating a tire rubber asphalt compound is described. The method includes receiving an asphalt compound and heating the asphalt compound to approximately 320° F. to 420° F. The method then proceeds to add tire rubber to the asphalt compound. The asphalt compound and the scrap tire rubber are mixed for approximately 60 minutes to 360 minutes during heating to approximately 525° F. to 700° F. to generate the tire rubber asphalt compound. The tire rubber asphalt compound is then cooled.

21 Claims, 3 Drawing Sheets

SYSTEM AND METHOD FOR GENERATING TIRE RUBBER ASPHALT

CROSS REFERENCE

This patent application claims the benefit of provisional patent application 62/661,609 entitled SYSTEM AND METHOD OF DISSOLVING TIRE RUBBER filed on Apr. 23, 2018. Additionally, this patent application claims is a continuation-in-part of utility patent application Ser. No. 15/283,821, entitled DISSOLVING TIRE RUBBER, which claims the benefit of provisional patent application 62/236,861, entitled DISSOLVING TIRE RUBBER filed on Oct. 3, 2015; all of which patent applications are incorporated by reference in this patent application filing.

FIELD

This invention relates to a composition, system and method for generating tire rubber asphalt. More specifically, the invention relates to a composition, systems and methods for dissolving tire rubber in asphalt or oil by heating the mixture.

BACKGROUND

Each year the U.S. generates approximately 290 million scrap tires. About 12 million scrap tires are converted into ground tire rubber (GTR) for modifying asphalt cements. Asphalt is a mixture of relatively high molecular weight compounds that do not distill off of petroleum in a refinery and include practically no polymers. In contrast, the major component of tire rubbers are cross-linked polymers. The utilization of scrap tire rubber in asphalt started in the mid-1960's when GTR was placed in asphalt surface treatments, such as chip seal applications.

In terms of environmental concerns, the disposal of scrap tires is a major waste management issue. While these environmental concerns are important, there are various challenges associated with using GTR and other forms of scrap tire rubber.

An initial challenge encountered with the use of GTR is GTR production. GTR, such as ASTM Standards D5603 and 5644, is commonly prepared by removing steel belts, bead wire, and various incorporated fabric plies from scrap tires. Entire processing facilities are required for removal of steel belts, bead wire and other byproducts incorporated into the scrap tires.

For another example, with respect to hot applied chip seal, the inconsistent dissolution of GTR and other forms of scrap tire rubber in asphalt can result in blockages to hot asphalt spray systems that apply the GTR/asphalt mixture. With respect to asphalt emulsions, the inconsistent dissolution of tire rubber in asphalt can interfere with the emulsification of asphalt in water due to the interference of the discrete undissolved rubber particles in the asphalt water inversion process. With respect to asphalt cutback, inconsistent dissolution of tire rubber in asphalt can result in blockages in cold asphalt spray systems used to apply the tire rubber solvent cut back asphalt to the road surface when used a gravel chip seal. With respect to tack coats, inconsistent dissolution of tire rubber in asphalt can interfere with even distribution and blockages in the spray applicator that may ultimately result in inferior pavement systems due to improper layers adhesion. With respect to pavement membranes, inconsistent dissolution of tire rubber in asphalt can interfere with even distribution and blockages in the spray applicator that may ultimately result in inferior pavement systems due to improper adhesion between the reinforcements and the pavement layers. With respect to pavement joint and caulking fillers, inconsistent dissolution of tire rubber in asphalt used in caulking formulations can interfere with even distribution and blockages in various applicators that may ultimately result in inferior sealing for pavement joints shortened road longevity. With respect to driveway sealers, inconsistent dissolution of tire rubber in asphalt used in driveway seal formulations can interfere with even distribution and sealing of the drive surface resulting in reduced protection.

The process of combining rubber with asphalt is described in various patents and patent publications.

For example, in U.S. Pat. No. 5,342,866, Trumbore teaches an elastomeric-asphalt composition which does not phase separate and which is compatible at high temperatures. In a preferred embodiment, the elastomeric materials are SBS and SIS block copolymers. Producing the asphalt composition includes preheating the asphalt to a temperature of at least about 350° F. Additionally, Trumbore teaches heating the mixture to a temperature of from about 400° F. to about 475° F. while maintaining the pressure in the converter under about 2 psig.

Nielsen in U.S. Pat. No. 4,068,023 teaches one of the earliest examples showing the incorporation of reclaimed rubber into asphalt for paving using elevated temperatures up to 450° F. with an admixture of aromatic oils.

In European Patent Application EP1877493 A2, Martin teaches a modified asphalt binder composition that includes about 40% by weight to about 98.9% by weight asphalt binder material, about 0.5% by weight to about 25% by weight crumb rubber, about 0.5% by weight to about 30% by weight of at least one synthetic polymer, and about 0.05% by weight to about 5% by weight of at least one acid. Martin also teaches a method for making a modified asphalt binder composition that includes providing neat asphalt, heating the neat asphalt to a temperature of between about 120° C. (248° F.) and about 200° C. (392° F.), adding a first modifying ingredient to the neat asphalt, mixing the asphalt and the first modifying ingredient with one of a high shear mixer or a low shear mixer for a period of between about 5 minutes and about 10 hours, adding a second modifying ingredient to the modified asphalt binder, mixing the second modifying ingredient and the modified asphalt binder in one of a high shear mixer or a low shear mixer for a period of between about 5 minutes and about 10 hours, adding a third modifying ingredient to the modified binder material, and agitating the third modifying ingredient and the modified binder material in one of a low shear mixer or a high shear mixer for a period of between about 5 minutes and about 48 hours.

In U.S. Pat. No. 5,492,561 Flanigan teaches incorporating the whole tire rubber into the asphalt medium by simulating a "boiling action" in the asphalt medium which allows the tire rubber to be absorbed into the asphalt medium at about 500° F. Flanigan states that below 485° F.-490° F. provides insufficient blending, while above 510° F. the temperature is too close to the flash point of the liquid. According to Flanigan, a temperature of about 500° F. is the safest temperature to use that is high enough to provide full incorporation of whole tire rubber granules into the asphalt medium but not so high that the process becomes unsafe. The Flanigan process produces a dissolved GTR after extended blending of 5-10 hours at 500° F., which degrades the asphalt blend by initiating an extended oxidation reaction that affects the quality of the asphalt.

Therefore, there exists a need for an improved asphalt production method and composition incorporating tire rubber into asphalt products.

SUMMARY

A method for generating a tire rubber asphalt compound is described. The method includes receiving an asphalt compound, heating the asphalt compound to approximately 320° F. to 420° F., and mixing the asphalt compound and tire rubber. The asphalt compound and the tire rubber are mixed for approximately 60 minutes to 360 minutes and heated to approximately 525° F. to 700° F. during mixing with little or no oxidation of the asphalt compound, the tire rubber, and the generated tire rubber asphalt compound. The tire rubber asphalt compound is then cooled.

In one illustrative embodiment, the method of generating the tire rubber asphalt compound further includes applying a neutral gas to the tire rubber asphalt compound during generation.

In a further embodiment, the generated tire rubber asphalt compound is cooled to 500° F. to 350° F.

In a still further embodiment, the method further includes separating the tire rubber asphalt compound from a metallic alloy included in the tire rubber.

In another embodiment, the asphalt compound has a penetration of 0 dmm to 200 dmm.

In yet another embodiment, the method includes receiving the asphalt compound and the tire rubber in a wetting tank that is heated to approximately 320° F. to 420° F. Then, the tire rubber asphalt compound is generated in a reaction vessel that is heated to approximately 525° F. to 700° F.

In still another embodiment, the asphalt compound and the tire rubber are received by a reaction vessel that is heated so that the tire rubber asphalt compound is generated in the reaction vessel.

Additionally, a method for generating a tire rubber asphalt compound from an oil compound is described. The method includes receiving an oil compound and heating the oil compound to approximately 320° F. to 420° F. The method then proceeds to add tire rubber to the oil compound. The oil compound and the scrap tire rubber are mixed for approximately 60 minutes to 360 minutes and heated approximately 525° F. to 700° F. during mixing to generate the tire rubber asphalt compound with little or no oxidation of the oil compound, the tire rubber, or the tire rubber asphalt compound. The tire rubber asphalt compound is then cooled.

FIGURES

The present invention will be more fully understood by reference to the following drawings which are presented for illustrative, not limiting, purposes.

DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the methods and compositions described herein may vary as to configuration and as to details. Additionally, the methods may vary as to details, order of the actions, or other variations without departing from the illustrative methods disclosed herein.

Processes such as Flanigan (described above) teach heating to a temperature of 485° F. to 510° F. and requires high shear mixing for 5 to 10 hours to reduces the particle size of the rubber to have a solubility of better than 90%. And the Flanigan process fails to improve the material performance because no significant increase in penetration at 77° F. is observed over the original bitumen. The inventors hypothesize that the exposure of the vulcanized rubber at this lower temperature fails to completely release the process oils from GTR or tire rubber and, further, due to the extended exposure of the mixture to heat and oxygen the bitumen is degraded by oxidation and a reduction of the bitumen maltene fraction. Furthermore, the Flanigan process shows an increase in the carbonyls and sulfoxides that have been reported as indicators of accelerated aging. Thus, there are various limitations of Flanigan that are overcome by the systems, methods and compositions presented herein.

Many polymers, such as unmodified tire rubber will slowly depolymerize in the presence of ozone, sun light, and high temperature spots caused by heavy traffic. Thus, the addition of unmodified tire rubber to asphalt can offer a low quality product that is not usually suitable for use as a road paving product. Depolymerization of rubber mixed into asphalt leads to cracks and other weaknesses in the asphalt product that are susceptible to water damage from freeze thaw cycles.

The systems, methods and compositions presented may be applied to asphalt road paving, asphalt bridge coating, hot mix asphalt, warm mix asphalt, cold mix asphalt, hot applied chip seal, applied emulsions, asphalt cutback, tack coats, pavement membranes, fog seal, bond coating, crack fillers, seal coats, thin overlay binders, microsurfacing, pavement joint and caulking fillers and driveway fillers. In some embodiments, the systems, methods and compositions presented may be applied to roofing flux, roofing coatings, polymer modified roofing compounds, peel and stick compounds, waterproofing applications, pipe metal, concrete, and other coatings. The systems and methods presented herein overcome the challenges associated with undissolved rubber or inconsistently dissolved rubber, and particularly scrap tire rubber.

With respect to hot and cold applied chip seal, the systems, methods and compositions drastically reduce spray blockages during hot chip seal application. Additionally, the uniformity and consistent viscosity results in a more even asphalt application and improved adhesion of the gravel chip seal to the road surface.

With respect to asphalt emulsions, the systems, methods and compositions presented herein result in a high solubility of the tire rubber, which allows for a uniform dispersion of a consistent viscosity asphalt that is easily emulsified in anionic, cationic, and non-ionic emulsion technologies.

The systems, methods and compositions combine tire rubber and asphalt at a high temperature to produce an improved asphalt mixture referred to as a tire rubber asphalt compound. The "tire rubber" used to produce the tire rubber asphalt compound may include, by way of example and not of limitation, ground tire rubber (GTR), scrap tire rubber, whole tires, other such tire rubber, and any combination thereof.

Additionally, the systems, methods and compositions presented herein provide a better than 99% dissolution of tire rubber that drastically reduces spray blockages. Additionally, the systems, methods and compositions provide uniform and consistent viscosity results, which provides improved adhesion. Furthermore, the dark coloration from the carbon black in the tire rubber results in a uniform black surface with improved weather capabilities. Further still, the oils released from the tire rubber improve the tack and adhesion properties of the resulting tire rubber asphalt compound, providing a stronger bond to surfaces, e.g. a driveway surface. Finally, the systems, methods and compositions provide the inclusion of modified rubber compounds that are partially depolymerized through heating.

While depolymerization of the rubber added to the asphalt and oil compounds described herein is beneficial, pyrolization is detrimental. When rubber is exposed to too high a temperature for too long the rubber degrades and produces a complicated rubber and asphalt or rubber and oil mixture comprising many highly volatile compounds that may be useful as a fuel but not as an asphalt/oil product and exhibiting a viscosity lower than desired in a workable asphalt/oil product. Further, the resulting fuel product contains significant quantities of sulfur compounds that must be removed. The maximum reported degradation rates for rubber occur above 700° F.

In contrast, process temperatures that are too low do not result in sufficient depolymerization. The inventors hypothesize that below 525 F very limited depolymerization occurs, and instead rubber is simply devulcanized or de-cross-linked. And to accomplish the requisite level of depolymerization at temperatures below 525 F would require too long too expensive a process, such as requiring expensive shear or elevated pressure, for practical industrial process scales.

The systems, methods and compositions presented herein may be applied to asphalt cutback, pavement membranes, tack coats, pavement joint and caulking fillers driveway sealer, roofing flux, roofing coatings, polymer modified roofing compounds, peel and stick compounds, waterproofing applications, pipe metal, concrete, and other coatings. Asphalt tack coats (hot applied, solvent, and emulsion based) are used to improve the adhesion between layers of asphalt pavement.

The inventors hypothesize that the systems and methods presented herein release the beneficial oils and carbon black from the vulcanized rubber, which enhances the maltene fraction of the resulting tire rubber asphalt compound. These released beneficial oils improve the pliability of the asphalt binder. The release of carbon black improves the weathering resistance because the asphalt can retain its dark color. Also, the release of the carbon black results in a deep black asphalt coloration that maintains a high contrast marking surface longer than conventional asphalt binders. Further, the inventors hypothesize that the systems and methods presented herein partially depolymerize the rubbers added to the asphalt or oil compounds, thereby limiting further depolymerization of the resulting product from exposure to sun light and atmosphere while in use.

The systems, methods, and compositions presented herein may be applied to asphalt road paving as a "binder." The term binder is defined more clearly in the compositions section below.

The term "asphalt" is defined by the American Society for Testing and Material (ASTM) as a dark brown to black cementitious material solid or semi solid in consistency, in which the predominating constituents are bitumens which occur in nature as such or are obtained in residue in refining petroleum. Asphalt is a constituent of most crude petroleum. More generally, the present compositions and methods described herein consider asphalt a colloidal system. Asphalt is composed of asphaltenes and maltenes. The relative amounts of asphaltenes and maltenes determine the physical and chemical behavior of any given asphalt.

The term "bitumen" refers to a generic term that according to the ASTM relates to a mixture of hydrocarbons of natural or pyrogenous origin, or a combination of both, frequently accompanied by their non-metallic derivates, which may be gaseous, liquid, semisolid, or solid and which are completely soluble in carbon disulphide. In commercial practice the term bitumen is used for the semisolid or solid bitumen which includes asphalts, tars and pitches. The latter two materials are obtained by destructive heat action on crude oil, coal and other organic materials.

The term "asphaltene(s)" refers to the portion of asphalt that is naphtha insoluble, so that in an excess of naphtha the asphaltenes remain insoluble. The asphaltenes may represent up to 50% of asphalt, in which a major portion of total Oxygen, Nitrogen, Sulfur, Nickel and Vanadium are concentrated. Asphaltenes are brown to black amorphous solids. Asphaltenes have carbon/hydrogen ratios of 0.81-1.00 which indicates they are aromatic in nature. Their molecular weight ranges from 500-7000 Daltons (Da).

The term "maltene" refers to the naphtha soluble portion of asphalt. The maltene fraction is free of asphaltenes and carbenes. The maltene carbon/hydrogen ratio is in the range of 0.6-0.75 which indicates that the molecular structure includes aliphatic chains or saturated rings. The maltene fraction includes resins and oils. The molecular weights are in the range of 500-1500 Daltons (Da).

The term "resins" refers to cyclic aromatic compounds.

The term "oils" refers to saturated hydrocarbons having appreciable wax content.

The term "carbenes" refers to the highest carbon content fraction of asphalt. Carbenes are insoluble in carbon tetrachloride. Carbenes, if present, occur in trace amounts.

The terms "asphalt feedstock" and "asphalt compound" refer to an asphalt starting material.

The term "penetration" refers to the depth a standard steel needle with a truncated cone penetrates a properly prepared sample of asphalt. Penetration is related to hardness or consistency of the asphalt. The apparatus which permits the needle holder to move vertically without fraction and measures the depth of penetration to the nearest 0.1 mm is known as penetrometer. The distance that the needle penetrates in units of tenths of a millimeter is the penetration value. The weight of the needle is 50 g and another 50 g weight is placed on the needle, which results in a 100 g weight. The needle is slowly lowered onto a sample until it just makes contact with the surface of the sample. The dial of the penetrometer is adjusted to zero and the needle is released quickly for the specified period of five seconds and the distance penetrated is measured to the tenth of a millimeter.

The term "softening point" refers to a measure of temperature in which a steel ball passes through a ring that includes the asphalt sample and falls a distance of 2.54 cm, when the specimen, ball and bath of water/glycerin are heating at a specified rate. A steel ball, 9.54 mm in diameter, is placed in each ball centering guide.

The term "viscosity" refers to the viscosity determination of asphalt at elevated temperatures using a rotational viscometer as described in ASTM D4402, which is hereby incorporated by reference.

The term "Styrenic Block Copolymer" or "SBC" refers to a large category of thermoplastic elastomers. SBCs possess the mechanical properties of rubbers, and the processing characteristics of thermoplastics. There are four major types of SBCs, namely, Styrene-Butadiene-Styrene (SBS) block polymers, Styrene-isoprene-styrene (SIS) block copolymers, Styrene-Ethylene-Butylene-Styrene (SEBS), and hydrogenated styrenic block copolymers (HSBC).

The term "neutral gas" refers to non-reactive gases, such as, but not limited to, argon, carbon dioxide, helium, neon, and nitrogen.

Method for Dissolving Tire Rubber

Figure 1A:
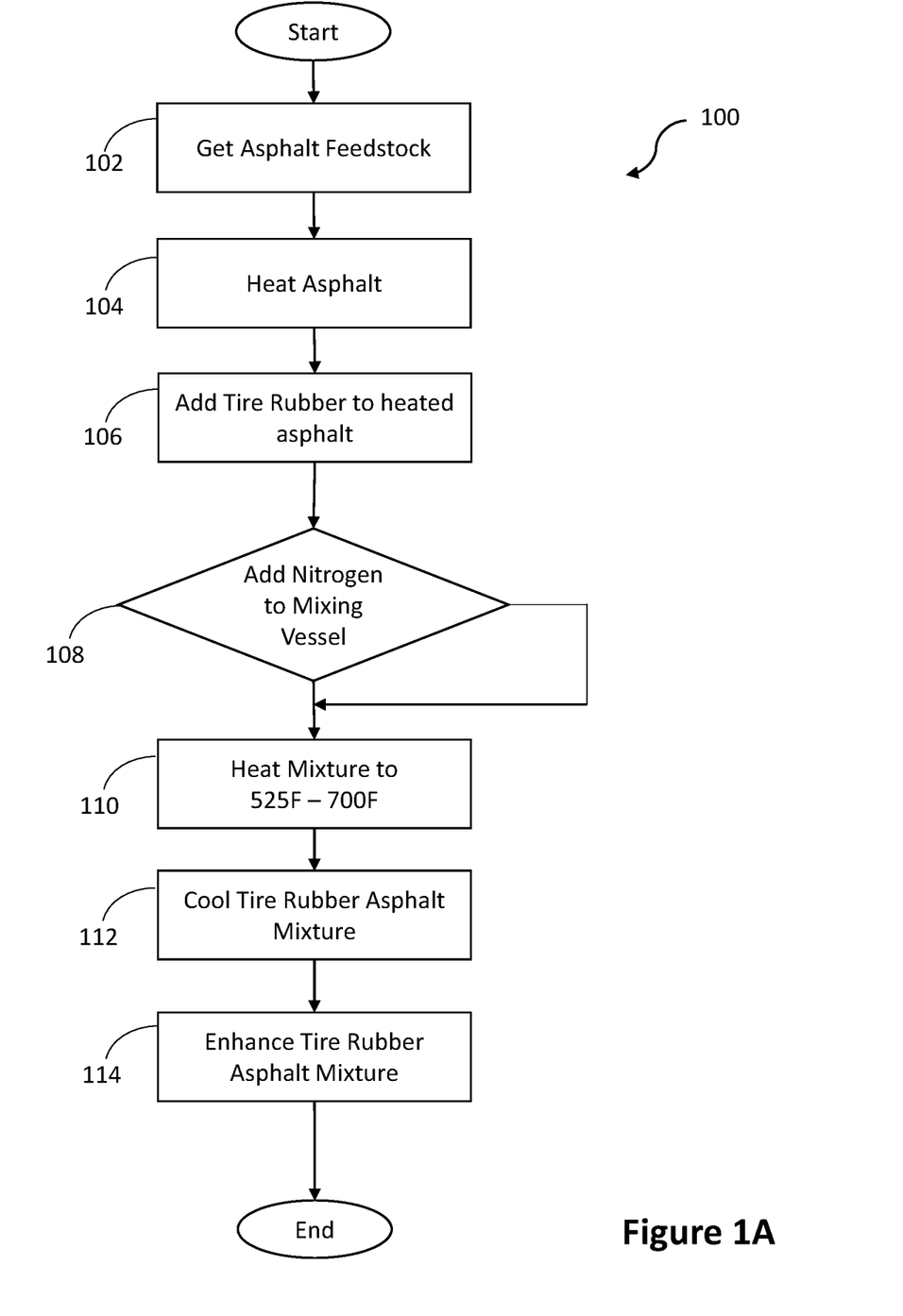
FIG. 1A shows an illustrative flow chart of a method for generating a dissolved rubber compound from tire rubber and an asphalt feedstock.

Referring to FIG. 1A, there is shown an illustrative method 100 for dissolving tire rubber in asphalt. The method presented herein exposes the tire rubber to temperatures exceeding 525° F. for periods of 6 hours or less causes the tire rubber to release process oils embedded within the tire rubber into the asphalt.

The method is initiated at block 102 where an appropriate asphalt feedstock is selected. By way of example and not of limitation, the illustrative asphalt feedstock has a penetration of 135 dmm @ 77° F.

The method then proceeds to block 104, in which the asphalt feedstock is heated to between 320° F. to 420° F.

At block 106, tire rubber is added to the heated asphalt and stirred. By way of example and not of limitation, a preliminary mixing process is initiated in a "wetting tank" 202 (shown in FIG. 2) where the tire rubber is combined with asphalt. This preliminary mixing process effectively disperses the dry tire rubber so that a uniform mixture can be pumped at approximately 375° F. to 400° F. into a separate mixing vessel or reaction vessel.

Figure 2:
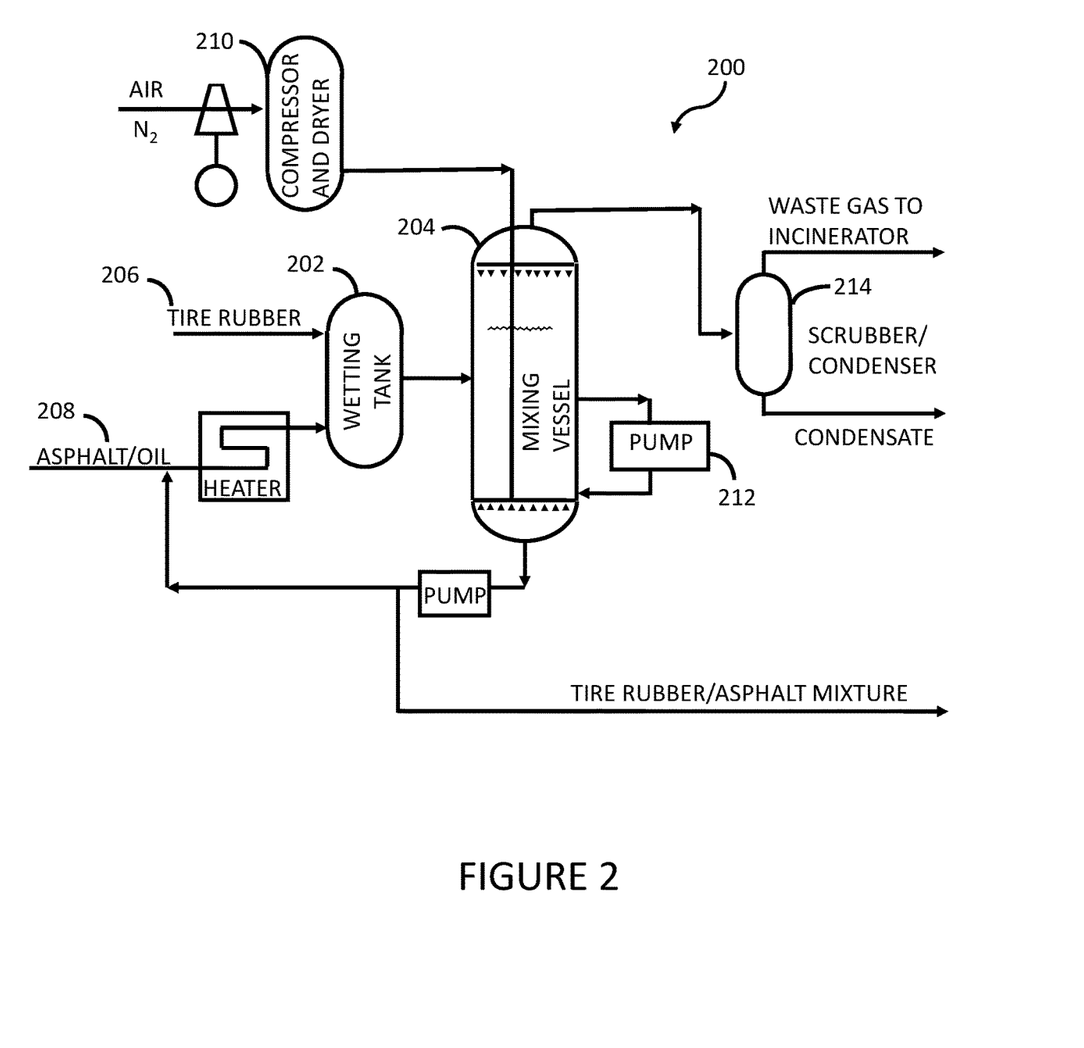
FIG. 2 shows an illustrative batch reaction process.

In another embodiment, the preliminary mixing process is not initiated in a wetting tank, instead tire rubber is added to the asphalt feedstock in the mixing vessel or reaction vessel 204 (shown in FIG. 2). In this embodiment, the tire rubber may include GTR, scrap tire rubber, tire rubber chunks or scraps, other such tire rubber or any combination thereof.

In still another embodiment, at least some of the asphalt feedstock includes Trinidad Lake Asphalt, which is a thermoplastic material. The Trinidad Lake Asphalt acts as a carrier for the tire rubber into the wetting tank 202. In a still further embodiment, the Trinidad Lake Asphalt acts as a carrier for the tire rubber directly into the reactor vessel or mixing vessel 204.

In a broad illustrative embodiment, 1% to 70% by weight of tire rubber is added to the heated asphalt. In a narrower illustrative embodiment, 5% to 50% by weight of tire rubber is added to the heated asphalt. In an even narrower illustrative embodiment, 7% to 30% by weight of tire rubber is added to the heated asphalt.

At decision diamond 108, a determination is made whether to add Nitrogen or other neutral gas to the mixing chamber. The illustrative application of Nitrogen to the mixing chamber ensures that there is little or no oxidation in the mixing chamber. Although the illustrative process can be performed in air, the use of a Nitrogen blanket or other neutral gas excludes air and oxygen from the reactor environment. However, there may be circumstances where some oxidation is necessary and thus some air or oxygen enters the reactor environment. In another illustrative embodiment, the mixing chamber has some air, but is surrounded by an inert atmosphere so there is minimal oxidation.

In operation, Nitrogen ($N_2$) is added to the top of the reactor, i.e. mixing vessel, to provide a low pressure sweep in the headspace of the mixing vessel to remove the air and prevent oxygen entrapment in the asphalt/tire rubber mixture during the reaction in block 110. Additionally, Nitrogen may also be introduced from the bottom of the reactor. In certain embodiments, Nitrogen may be introduced in the headspace and the bottom of the mixing vessel.

At block 110, the mixture of asphalt and tire rubber is heated to approximately 525° F.-700° F. in the illustrative mixing vessel, which is also interchangeably referred to as a "reactor" or "reaction vessel." In a narrower illustrative embodiment, the tire rubber and asphalt are heated to 575° F.-625° F. In another narrower illustrative embodiment, the tire rubber and asphalt are heated to 600° F.-650° F. In an even narrower illustrative embodiment, the tire rubber and asphalt is heated to 590° F.-610° F.

The asphalt/tire rubber material is mixed for approximately 5 minutes to 360 minutes. In a narrower illustrative embodiment, the asphalt/tire rubber material is mixed for approximately 5 minutes to 60 minutes. In one illustrative embodiment, the mixing vessel includes a circulating pump that uniformly mixes the asphalt/tire rubber during the heating process in the mixing vessel. In another illustrative embodiment, a stirrer is used within the mixing vessel.

The uniform mixing process avoids hot spots within the reaction vessel 204, i.e. mixing chamber. Additionally, the uniform mixing produces an even heating rate as the asphalt/tire rubber mixture is raised from approximately 400° F. (in the wetting tank) to approximately 600° F. in the mixing vessel.

At block 112, the asphalt/tire rubber mixture is quenched with an addition of asphalt, which cools the asphalt/tire rubber mixture from approximately 600° F. to approximately 500° F. or less. In other embodiments, the tire rubber asphalt compound is cooled to 50° F. below the Cleveland Open Cup flash point of the tire rubber asphalt compound. In still other illustrative embodiments, water may be used to cool down the illustrative asphalt/tire rubber to 500° F. or less. In another embodiment, the asphalt and tire rubber mixture or the tire rubber asphalt compound is cooled by a heat exchanger.

The resulting mixture is referred to as "tire rubber asphalt compound." The resulting tire rubber and asphalt mixture experiences a significant increase of measured penetration depth at 77° F. over the original bitumen or asphalt stock while minimizing the oxidation and aging reactions associated with exposure of bitumen/asphalt to high temperatures.

The inventors hypothesize that the heated tire rubber releases process oils from the tire rubber into the maltene fraction of the asphalt, which improves both the oxidation resistance and ductility properties. Additionally, the inventors hypothesize that the bitumen (asphalt) is actually rejuvenated by the increase of the maltene to asphaltene fraction as observed when processing bitumen with vulcanized rubber, i.e. the tire rubber asphalt compound.

The inventors also hypothesize that the Sulfur-Carbon (S-C) bonds are easier to break than the Carbon-Carbon (C-C) bonds. In other words, the heating process described herein "devulcanizes" the rubber by removing the cross-linking caused by the S-C between the polymer chains having the C—C bonds. The result is the more soluble polymers, i.e. oils with C—C bonds, are dissolved in the mixing vessel. In some embodiments, this dissolution of soluble polymer occurs prior to increasing the temperature in the reaction vessel to 525° F.-700° F.

This hypothesis is supported by the finding that the addition and dissolution of tire rubber reduces the flash point. For example, an original asphalt flux COC flash point was 687° F. After incorporation of 20% tire rubber scraps or chunks at 600° F. for 30 minutes, the COC flash point dropped to 608° F. This drop in flash point is caused by more soluble oils being released from the tire rubber. Recall that the process oils used to manufacture tires have flash points ranging from 400° F.-500° F., thus the flash point would be reduced when the oils are released from their fixated state in the tire rubber chunks.

At block 114, the method may proceed to enhance the resulting asphalt/tire rubber mixture by addition of a wide range of polymers such as styrenic block copolymers (SBCs), olefinic elastomers, olefinic vinyl acetates, natural rubber, and various agents that emulsify the composition. The use of polymers treated with various oils, asphalt flux, or plasticizers prior to mixing with the tire rubber asphalt compound allows for the incorporation of high molecular weight polymers at relatively low quantities that enhance both the flexibility and elasticity of the final tire rubber asphalt compound. Also, common emulsification agents and reagents can be used to adjust pH for the production of either cationic or anion emulsions. In various embodiments, the tire rubber may consist of GTR, scrap tire rubber, tire rubber chunks, or any combination thereof.

Furthermore, similar to the recent use of saponification agents, such as stearamides and phosphates, in bitumen, saponification agents can be added to the resulting tire rubber asphalt compound to adjust the properties of softening point and penetration depth while allowing good viscosity control as needed. The tire rubber asphalt compound may also be combined with saturated fabrics such as fiberglass, polyester, rayon, nylon, or combinations thereof in various applications, such as paving, roofing, mining liners, and waterproofing. Further still that tire rubber asphalt compound may be used in drilling fluid applications to improving the viscosity curve of asphalt, thereby expanding the range of formulation options available to a drill fluid chemist.

Further still, the use of GTR and other vulcanized rubber containing carbon black enhances the black color of the tire rubber asphalt compound. This enhancement in addition to the improved weathering commonly associated with carbon black, allows the paving produced with tire rubber asphalt compounds to yield a long lasting high contrast surface for traffic marking that greatly improves both day and night time visibility. Additionally, in roofing applications, the carbon black stabilizes the roof coating, improving weathering resistance, and provides a deep black uniform surface for enhanced appearance of various blended and single color granule applications.

Modified Method for Dissolving Tires

Figure 1B:
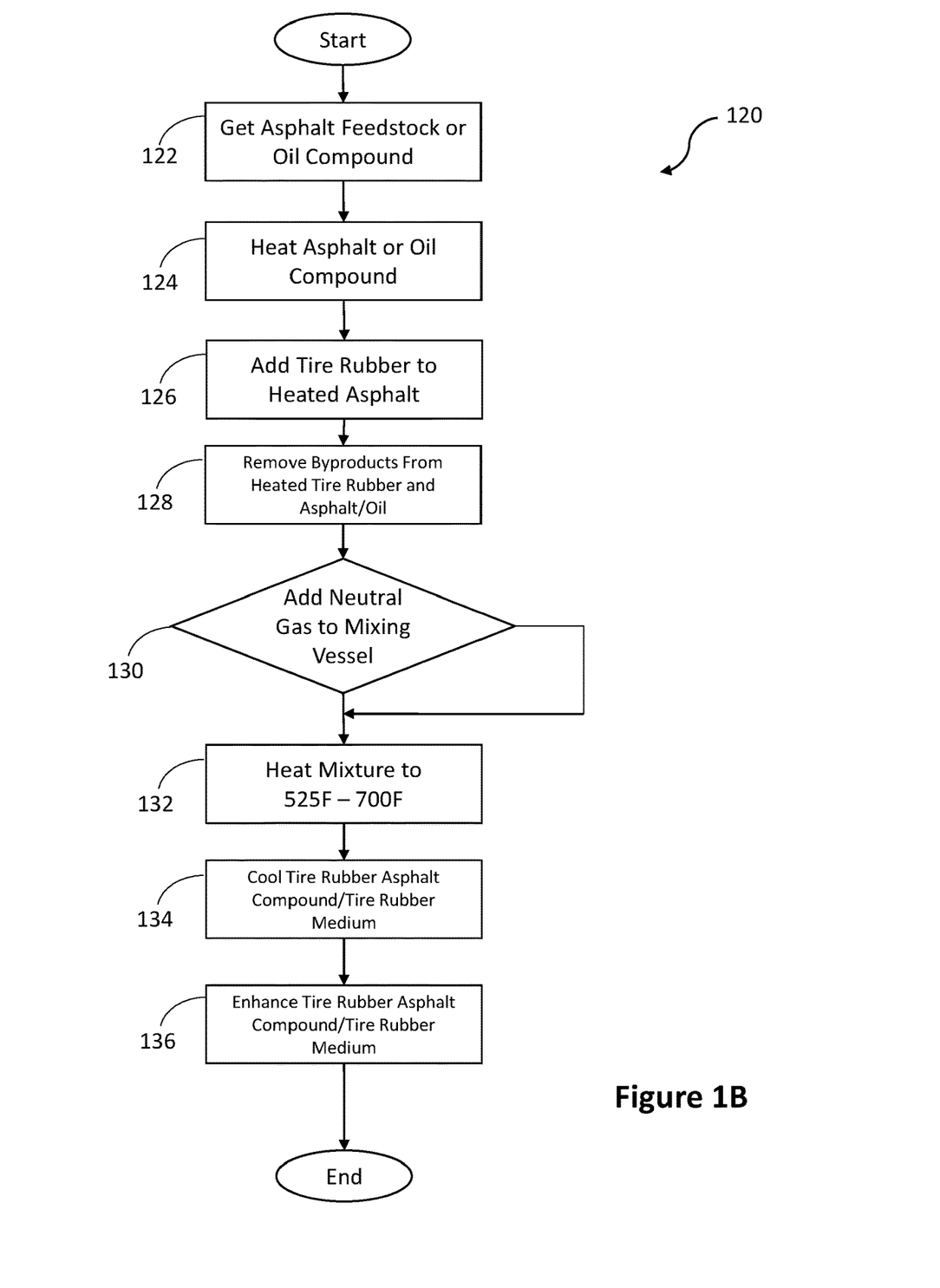
FIG. 1B shows an illustrative flow chart of a modified method for generating a dissolved rubber compound from tire rubber and an asphalt feedstock.

The illustrative method 100 for dissolving tire rubber may also be modified to receive vulcanized rubber from entire tires or partially cut tires as shown in method 120 presented in FIG. 1B. While most processes require that the vulcanized rubber such as tires be ground to remove the bias and steel ply adding substantial cost to the preparation of the material, the illustrative method 100 may be modified to support placement of entire tires or partially cut tire scraps into a bath of oil or asphalt, followed by heating and stirring to provide uniform heat distribution, as shown in illustrative method 120 of FIG. 1B.

In the modified method 120 shown in FIG. 1B, an oil compound may be used instead of asphalt feedstock at block 122. When an oil compound is used, instead of asphalt the resulting product is termed "tire rubber medium," for clarity. However, asphalt may also be used at block 122 to produce a tire rubber asphalt compound.

The method then proceeds to block 124, in which the asphalt feedstock or oil compound is heated to between 320° F. to 420° F.

At block 126, tire rubber is added to the heated asphalt or oil compound and stirred. By way of example and not of limitation, the preliminary mixing process is initiated in the wetting tank 202 (shown in FIG. 2) where the tire rubber is combined with the asphalt compound or the oil compound. This preliminary mixing process effectively disperses the dry tire rubber so that a uniform mixture can be pumped at approximately 375° F. to 400° F. into a separate mixing vessel or reaction vessel 204 (shown in FIG. 2).

In another embodiment, the preliminary mixing process is not initiated in a wetting tank, instead tire rubber is added to the asphalt compound or oil compound in a mixing vessel or reaction vessel. In this embodiment, the tire rubber can comprise GTR, tire rubber scraps, whole tires, or any combination thereof.

At block 128, after the vulcanized rubber, oil, and carbon black are released from the tire ply into the liquid medium, the dissolved material (tire rubber and asphalt or oil) is then drained from the heating vessel leaving the ply material, steel belting, steel wire, and generally byproducts behind. The byproducts are then removed and washed with a suitable solvent to remove excess asphalt/oil from the ply and belts. The removal may be performed by a separator that is located within the wetting tank, between the wetting tank and the mixing tank, or external to the mixing tank. The separator may be a sieve or a grate configured to allow oil, asphalt, and dissolved tire rubber to pass through while stopping or retaining undissolved byproducts. In some embodiments, a magnet is used to remove the steel belts, which can then be recycled. The separated metallic alloy or steel waste material can then be subjected to pyrolytic heating to further remove asphalt or oil from the metallic alloy or steel waste. The tire rubber medium or tire rubber asphalt compound may then be used in the wide range of applications that employ asphalt.

In various embodiments, 50% or more of the mixture is tire rubber. In one embodiment, the dissolved tire rubber medium is 50% tire rubber by weight. The tire rubber can be large pieces that range in width from 1" up to the entire width of the source tire and from 1" to 12" in length. In other embodiments, tire rubber can be whole scrap tires. In some embodiments, the dissolved tire rubber compound comprises 20%-50% by weight tire rubber. In embodiments utilizing 50% or more tire rubber, the tire rubber is added to asphalt media having a penetration of 0 dmm to 200 dmm with stirring to obtain even heat distribution.

The asphalt media is contained in a mixing vessel, and at decision diamond 130, a determination is made whether to add Nitrogen or other neutral gas to the mixing chamber. The vessel is purged and then swept to remove oxygen from the headspace of the vessel. Removal of oxygen prevents oxidation at temperatures approaching the lowest flash point of the mixture components, and prevents autoignition at processing temperatures, such as above 600° F.

At block 132 the mixture of asphalt/oil and tire rubber is heated to approximately 525° F.-700° F. in the illustrative mixing vessel 204. In one embodiment, upon adding the tire rubber to the asphalt media/compound the resulting mixture is rapidly heated to 600° F. to 650° F. for 60 minutes to 360 minutes under stirring. In some embodiments, during this heating and stirring process the steel completely separates from the tire rubber, and the decomposed tire rubber, process oils, carbon black, mineral fibers, and polyester fabrics become fully incorporated into the asphalt. The steel physically separates from the tire rubber due to the difference in the thermal expansion rate between steel and rubber. In these embodiments, the byproducts were not removed after or during the initial heating and mixing, but instead remained within the mixture of asphalt/oil and tire rubber and washed with a suitable solvent to remove excess asphalt/oil from the ply and belts after heating to 525° F.-700° F.

The resulting tire rubber asphalt compound or tire rubber medium is then cooled to 400° F. to 500° F., or as low as 350° F. at block 134. In other embodiments, the tire rubber asphalt compound or tire rubber medium is cooled to 50° F. below the Cleveland Open Cup flash point of the tire rubber asphalt compound or tire rubber medium. In some embodiments, the resulting tire rubber asphalt compound or tire rubber medium can be cooled through a second addition of unheated asphalt or oil compound that quenches the tire rubber asphalt compound or tire rubber medium. In other embodiments, the tire rubber asphalt compound or tire rubber medium can be cooled by a heat exchanger. After cooling, in embodiments where the byproducts were not removed earlier, the tire rubber asphalt compound or tire rubber medium is decanted from the steel belting and other byproducts remaining in the tire rubber asphalt compound or tire rubber medium. The decanted steel byproducts can then be subjected to pyrolytic heating to clean the steel byproducts.

In some embodiments, SBCs are added to the tire rubber asphalt compound or tire rubber medium at block 136. In one embodiment, SBCs are added to the tire rubber and oil compound or the tire rubber and asphalt compound prior to heating. In another embodiment, SBCs are added to the tire rubber and oil compound or the tire rubber and asphalt compound during heating. In still another embodiment, SBCs are added to the tire rubber asphalt compound or tire rubber medium after heating. In some embodiments, the SBCs include SEBSs.

In one embodiment, the byproducts remaining in the tire rubber asphalt compound include materials having a flashpoint in the range of fuel oil. A significant portion of the byproduct materials having a flashpoint in the range of fuel oil are collected in a knock out drum, a scrubber, a vacuum unit, or other separation device. The knock drum uses the collected fuel oil byproduct to seal the head space of the reaction vessel from oxygen. The byproduct waste oil accumulates and overflows into a collection tank, and can then be harvested for sale or cleaned for use as a fuel source to supplement fuel used in the tire rubber asphalt compound production processes.

In still another embodiment, the reaction vessel or mixing vessel applies a vacuum to the head space after reaching 600° F. for a period of at least 1 hour. The 1 hour time limit allows lighter weight materials to be removed prior to applying the vacuum. The lighter weight materials include diesel fuels. This embodiment increases the flash point of the product to approximately 450° F. to 550° F. under vacuum.

The primary advantage to this modified method for dissolving tire rubber is the simplification of the pre-treatment required to process tires for recycling. The modified method eliminates the need for grinding to mesh size material using expensive cryogenic or hydrological systems. Since the steel belts and ply are very large size in the dissolved medium, i.e. the tire rubber asphalt compound and the tire rubber medium, they are easily recovered with simple straining and filtering mechanisms for subsequent cleaning with suitable solvents for recycling. Additional advantages flow from inclusion of unprocessed tire rubber, including improved accelerated aging and crack resistance of paving and roofing asphalt. A further advantage of incorporating unprocessed tire rubber reduces the viscosity of the tire rubber asphalt compound and tire rubber medium, thereby improving the flow characteristics of the compound/medium, and allows for lower operating temperatures and therefore decreases the energy cost associated with using asphalt incorporating dissolved tire rubber. The addition of 50% or more tire rubber to the asphalt compound dramatically reduces the cost of the final paving product, while providing an outlet for disposal of used highway aggregates, as well as post-industrial and post-consumer roofing shingles. Further, the addition of 50% or more tire rubber to the asphalt compound reduces cost less directly by improving the solubility and compatibility of other polymer based modifiers, both styrenic and olefinic.

System for Dissolving Tire Rubber

Referring now to FIG. 2 there is shown a system 200 that controls a batch process that dissolves tire rubber in asphalt or oil. The illustrative system 200 includes a wetting tank 202 that receives an asphalt feedstock or an oil compound. Additionally, tire rubber 206 may also be received by the wetting tank 202. Wetting tank 202 performs preliminary mixing and heats the tire rubber 206 and the asphalt/oil 208 to approximately 375° F. to 400° F.

The preliminary mixture of tire rubber and heated asphalt or oil is then pumped to a reactor 204, which is filled to the desired operating level, e.g. 65% to 75% of the column height. In some embodiments, the reactor 204 includes an agitator that stirs the preliminary mixture of tire rubber and heated asphalt or oil.

The illustrative reactor 204 is a vertical vessel equipped with a gas distribution component 210, which has a feeder at the top and bottom of the reactor 208. The gas distribution component 210 may receive Nitrogen, air or any other such gas. In one illustrative embodiment, Nitrogen ($N_2$) is added to the top of the mixing vessel 204 to provide a low pressure sweep in the headspace of the mixing vessel to remove the air and prevent oxygen entrapment in the asphalt/tire rubber mixture during the reaction in block 110 and 132 of FIGS. 1A and 1B. Nitrogen may also be introduced from the bottom of the reactor or in the combination of the headspace and the bottom of the mixing vessel.

The mixture of asphalt and tire rubber is heated to approximately 525° F. to 700° F. in the mixing vessel 204. In the illustrative embodiment, the mixing vessel includes a circulating pump 212 that uniformly mixes the asphalt and tire rubber during the heating process in the mixing vessel 204. The uniform mixing process avoids hot spots within the reaction vessel 204, i.e. mixing chamber.

The asphalt/tire rubber mixture is quenched with the addition of asphalt, which cools the asphalt/tire rubber mixture from approximately 525° F. to 700° F. down to approximately 500° F. or less. In another illustrative embodiment, water may be used to cool down the illustrative asphalt/tire rubber 500° F. or less.

The resulting mixture may then be referred to as a "tire rubber asphalt compound." The resultant tire rubber and asphalt mixture experiences a significant increase of penetration at 77° F. over the original bitumen while minimizing the oxidation and aging reactions associated with exposure of bitumen to high temperatures.

Fumes produced in the process may be disposed of with a scrubber/condenser 214.

EMBODIMENTS

In the illustrative embodiments presented herein, an asphalt feedstock is mixed with natural or synthetic rubber items, and the mixture is heated to 600° F. with stirring for at least 10 minutes. The illustrative embodiments show a substantial increase in the penetration of the resulting rubber and asphalt mixture, which is homogeneous and can be poured through a 100 mesh sieve. The rubber and asphalt compound may be solubilized in D-Limonene with better than 99.0% passing through No. 54 Whatman filter paper.

Example 1

In this illustrative embodiment, an asphalt feedstock having a penetration of 135 dmm @ 77° F. is heated to between 320° F. to 420° F. Approximately, 10% GTR was added to the heated asphalt and stirred at 4200 rpm. After approximately 15 minutes of mixing, the mixing speed is reduced to 4000 rpm and stirring continues for an additional 15 minutes. During the stirring process, the mixture of asphalt and GTR is heated to approximately 605° F. The asphalt/tire rubber mixture is then held at 600° F. to 605° F. for 15 minutes. After the asphalt/tire rubber mixture is heated to 605° F. for 15 minutes, the stirrer is turned off and the mixture cools to approximately 350° F. to 360° F. and samples prepared for physical property testing. The resulting mixture is referred to as a tire rubber asphalt compound.

The solubility of the tire rubber asphalt compound was tested by dissolving 3 grams of the compound in a 125 ml of a solution composed of at least 90% D-Limonene CAS 5989-27-5. The solution was warmed gently on a hot plate with stirring for approximately 5 to 7 minutes—at which point the solid tire rubber asphalt compound sample is visibly dissolved in the D-Limonene. The solution was allowed to return to ambient temperature (about 15 minutes) and vacuum filtered using a No. 54 Whatman filter paper and Buchner funnel. It was found that 99.4% of the solution passed the filter leaving a gray-tan coloration on the filter paper.

TABLE I

| Property | Before Heating | After Heating | % Change |
|---|---|---|---|
| V275F D4402 (cP) | 250 | 352 | 71 |
| V350F D4402 (cP) | 48 | 83 | 173 |
| Soft. Point D38, (° F.) | 112 | 111 | 0 |
| Pen 77° F. D5 (dmm) | 135 | 200 | 148 |
| $G^*/\sin \delta$ @ 58 C., (Pa S) | 0.958 | 0.960 | 0 |
| $G^*/\sin \delta$ @ 52 C., (Pa S) | 2.21 | 1.30 | −41 |
| *D-Limonene Solubility using D2042 (%) | NA | 99.4 | NA |

(*D-Limonene substituted for trichoroethylene for safety)

Table I presents the physical properties "before heating" the feedstock, which does not include the 10% GTR and "before heating" to approximately 600° F. The addition of GTR and heating to approximately 600° F. results in a significant increase in viscosity as reflected by rows V275F and V350F. The increase in viscosity indicates that the GTR has been fully incorporated into the mixture. Thus, the GTR is substantially more than a particle dispersion in the asphalt mixture.

Table I also reflects that there no significant change in softening point (Soft. Point) of the asphalt after the GTR is added and the treated to 600° F. However, a substantial increase in penetration (Pen) is observed after the GTR is digested at approximately 600° F. This increase in penetration is likely due to the release of compounding oils from the tire rubber into the asphalt, with little or no significant oxidation of the asphalt place because of a Nitrogen purge on the reactor.

The $G^*/\sin \delta$ @ 58° C. (Pa S) is a rheological measure of road binder stiffness before any type of age conditioning. In this illustrative example, the oil released from the GTR has minimal impact on the road binder stiffness.

The $G^*/\sin \delta$ @ 52° C., (Pa S) is a rheological measure representing the measure of road binder stiffness by aging in a Rolling Thin Film Oven (RTFO) for 86 minutes at 140° C., which simulates aging in a paving hot mix plant. Typically, an unaged binder has a value of "1" before RTFO aging, and this value increases to approximately "2.2" following RTFO aging.

Interestingly, after heating the tire rubber/asphalt mixture with Nitrogen purging, the RTFO aging value is "1.3." The inventors' postulate that the oils from the GTR that are extracted during the heating of the tire rubber/asphalt mixture reduce the effects of aging. This unexpected result substantially improves the aging of the tire rubber/asphalt mixture.

To validate that the GTR has been solubilized into the asphalt the D-Limonene Solubility test as described in ASTM D2042 is utilized. The solubility test indicates that after a cold solvent wash, less than 0.6% residue remains, thus showing that the GTR has been substantially solubilized.

Example 2

In this illustrative embodiment, an 80 mesh GTR at 20% is mixed with an asphaltene having a penetration of less than 23 dmm. More specifically, the asphaltene having a penetration of less than 23 dmm @ 77° F. is heated to between 320° F. to 420° F. Approximately 20% GTR was added to the heated asphalt and stirred at 4200 rpm. After approximately 15 minutes of mixing, the mixing speed is reduced to 4000 rpm and stirring continues for an additional 15 minutes. During the stirring process, the mixture of asphalt and tire rubber is heated to approximately 605° F. The asphalt/tire rubber mixture is then held at 600° F. to 605° F. for 15 minutes. After the asphalt/tire rubber mixture is heated to 605° F. for 15 minutes, the stirrer is turned off and the mixture cools to approximately 350° F.-360° F. and samples prepared for physical property testing. A significant increase in penetration at 77° F. is observed in Table II results.

TABLE II

| Property | Before Heating | After Heating | % Change |
|---|---|---|---|
| V275F D4402 (cP) | 1174 | 1160 | 1 |
| V350F D4402 (cP) | NA | NA | NA |
| Soft. Point D38, (° F.) | 144 | 127 | −12 |
| Pen 77° F. D5 (dmm) | 22 | 77 | 250 |
| $G^*/\sin \delta$ @ 58 C., (Pa S) | NA | NA | NA |
| $G^*/\sin \delta$ @ 52 C., (Pa S) | NA | NA | NA |
| *D-Limonene Solubility using D2042 (%) | NA | 99.2 | NA |

Example 3

In a third illustrative embodiment, an asphaltene feedstock having a penetration of less than 23 dmm was mixing with 20% GTR having a 30 mesh size. The same method as described in Examples 1 and 2 was applied in Example 3. The results show a significant increase in penetration at 77° F. as observed in the initial experiment confirming the validity of the result with a larger GTR particle size.

TABLE III

| Property | Before Heating | After Heating | % Change |
|---|---|---|---|
| V275F D4402 (cP) | 1174 | 1347 | 15 |
| V350F D4402 (cP) | NA | NA | NA |
| Soft. Point D38, (° F.) | 144 | 139 | −3 |
| Pen 77° F. D5 (dmm) | 22 | 65 | 195 |
| G*/sin δ @ 58 C., (Pa S) | NA | NA | NA |
| G*/sin δ @ 52 C., (Pa S) | NA | NA | NA |
| *D-Limonene Solubility using D2042 (%) | NA | 99 | NA |

Binders

Asphalt binders cannot be represented by a single chemical formula. The American Society of Testing and Materials (ASTM) defines it as "a dark brown to black cementitious material in which the predominating constituents are bitumens which occur in nature or are obtained in petroleum processing." Asphalt binders are, however, fractionated into two subdivisions, i.e., asphaltenes and maltenes. Asphaltenes (A) are defined as that fraction of the asphalt insoluble in n-pentane. The function of the asphaltenes is to serve as a bodying agent. Maltene is the collective name for the remainder of the asphalt material left after precipitation of the asphaltenes.

Four principle bodies of maltenes have been identified and each has a specific function. These four bodies are polar compounds, first acidiffins, second acidiffins, and saturated hydrocarbons or paraffins that are cyclic or chained. Polar compounds or Nitrogen bases (N) include components of highly reactive resins, which act as peptizers for the asphaltenes. First acidiffins (A1) are components of resinous hydrocarbons which function as a solvent for the peptized asphaltenes. Second acidiffins (A2) include components of slightly unsaturated hydrocarbons that also serve as a solvent for the peptized asphaltenes. Saturated hydrocarbons or paraffins (P) are components of hydrocarbons, which function as a gelling agent for the asphalt components.

The cementing agent in an asphalt pavement, the asphalt binder (normally 4%-7% by weight) represents the component that experiences premature hardening as a result of oxidation.

Asphalt pavements, which are structurally sound, deteriorate as a result of oxidation and occasionally as a result of incorrect design or improper construction practice. Generally, the "A" and "P" asphalt components are the most stable; and the "N", "A1", and "A2" components are more subject to oxidation in descending order, respectively.

Consequently, during oxidation the "N" components convert to "A" components rapidly while the conversion process for the "A1" and "A2" components proceed at a slower rate. This process results in an increase (over time) of the "A" fraction of asphalt and a decrease (over time) in the "N", "A1", and "A2" components.

The maltenes parameter (N+A1)/(P+A2), which is the ratio of chemically more active to less reactive components present in the asphalt binder, is a measure of predictable durability. Thus, during the process of weathering or oxidation, the ratio of maltenes to asphaltenes is reduced with the result being a dry and brittle pavement.

Therefore, if a rejuvenator is to successfully resurrect an aged facility, it must be able to penetrate the pavement, and to a limited depth improve or restore the maltene to asphaltene balance. A reasonable measure of the ability of a rejuvenator to improve a pavement's durability can be had by comparing the penetration at 77° F. of the asphalt binder extracted from untreated and treated samples, and the viscosity at 140° F. of the asphalt binder extracted from untreated and treated samples.

In summary, the criteria for a rejuvenator, as disclosed herein, may contain maltenes fractions of asphalt in order to improve and balance the maltene to asphaltene ratio. A test method must be employed to measure improved durability of a pavement, such as an asphalt penetration or a viscosity test. Inventors acknowledge that some rejuvenators may use bio oils, such as peanut oil and vegetable oil, instead of maltenes. However, the bio oils associate with the maltene fraction, lowering the $T_g$ of the product and increasing the penetration of the product. These bio oils are more expensive, and require significant additions of binder, approximately 2% to 4%.

Compositions

Additional compositions of matter can be formulated with the tire rubber asphalt compound or tire rubber medium, which are generally referred to as "solubilized rubber compounds."

The solubilized rubber compound presented herein utilizes a significantly shorter process time and operates at a much higher temperature than other processes. In one embodiment, the solubilized rubber compound is heated to less than 60 minutes at 600° F., which solubilizes the tire rubber and releases oil and carbon black (from the tire rubber) with minimal degradation of the asphalt (or oil) using a Nitrogen blanket or some other oxygen minimizing technology, i.e. vacuum.

The solubilized rubber compound described above may be used to make solvent based cut backs, primers, hot and emulsion based highway tack coats and membranes, non-ionic emulsions, mastics, roof coatings solvent and emulsion based, waterproofing primers, and concrete and asphalt drive way sealers, joint caulking or filling compounds, rubber compounding oil, roofing with chopped fiber or partially saturated reinforcements or sub layers.

Additionally, the solubilized rubber compound may also be used with adhesives and sealants for roofing shingles and self-applied roofing and waterproofing membranes.

Furthermore, the solubilized rubber compound may be used in applications utilizing asphalt in automotive undercoating, pipe wrap, in addition to wire and cable wrap benefit from the carbon black released from the tire rubber along with the oils that improve both weathering and adhesion of these materials to a wide variety of substrates.

Further still, chemical treatment of the solubilized rubber compound can also be performed using various acids and catalyst common to the roofing and paving industries. In paving, it is common to add super polyphosphoric acid to improve flow properties of the asphalt and likewise enhances the solubilized rubber compound. The catalysts and acids can further include phenylhydrazine/ferrous chloride, phenylhydrazine/oxygen, peroxide/metal nitrite or chlorite, periodic acid, kalium persulfate/propanal, ammonium persulfate/propanal, and ozone/hydrogen peroxide.

Oxidized asphalt is routinely prepared using a range of acids and additives to catalyze the oxidation process by reducing the air blowing time and improve the desired properties of penetration, softening point, and viscosity. This solubilized rubber compound can be used to air blow with or without catalyst to make a roof coating that yields improved weathering from the carbon black and oils released from the tire rubber.

Thus, both catalyzed and uncatalyzed methods and systems of producing rubber asphalt compounds and tire rubber mediums are disclosed.

Likewise, post blending of the solubilized rubber compound into oxidized roofing coating to improve penetration and viscosity yields improved coating weathering performance.

The solubilized rubber compounds presented above may employed for asphalt pavement preservation, including rejuvenator emulsions, asphalt emulsion fog seals, a variety of surface treatments (including slurry and micro surfacing technologies), and emerging asphalt thin overlay technologies.

Table IV displays the various embodiments disclosed herein:

TABLE IV

| Embodiment | Process Elements |
| --- | --- |
| FIG. 1 method for dissolving scrap tire rubber | 1%-70% tire rubber and asphalt feedstock heated to 525° F.-700° F. for 5 min-60 min |
| Modified method 1 for dissolving tires | 50% or more tire rubber and asphalt feedstock heated to 600° F.-650° F. for 60 min-120 min |
| Modified method 2 for dissolving tires | 50% or more tire rubber and oil heated to 600° F.-650° F. for 60 min-120 min |
| System for dissolving rubber | Rubber and asphalt mixed in reaction vessel at 525° F.-700° F. under neutral gas |
| Example 1 | 10% GTR stirred into asphalt at 320° F.-420° F. and mixed for 30 min, scrap tire rubber and asphalt heated to 605° F. for 15 min, and cooled to approximately 350° F.-360° F. |
| Example 2 | 20% 80 mesh GTR stirred into asphalt at 320° F.-420° F. and mixed for 30 min, GTR and asphalt heated to 605° F. for 15 min, and cooled to approximately 350° F.-360° F. |
| Example 3 | 20% 30 mesh GTR stirred into asphalt at 320° F.-420° F. and mixed for 30 min, GTR and asphalt heated to 605° F. for 15 min, and cooled to approximately 350° F.-360° F. |

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A method for generating a tire asphalt compound comprising:
   receiving an asphalt compound;
   heating the asphalt compound to approximately 320° F. to 420° F.;
   adding a tire rubber to the asphalt compound;
   generating the tire rubber asphalt compound by mixing the asphalt compound and the tire rubber for 60 minutes to 360 minutes, wherein the asphalt compound and the tire rubber are heated to approximately 525° F. to 700° F. during mixing, and wherein there is little or no oxidation of the asphalt compound, the tire rubber, and the tire rubber asphalt compound; and
   cooling the tire rubber asphalt compound.

2. The method of claim 1 further comprising applying a neutral gas when generating the tire rubber asphalt compound.

3. The method of claim 1 further comprising cooling the tire rubber asphalt compound to 500° F. to 350° F.

4. The method of claim 1 further including separating the tire rubber asphalt compound from a metallic alloy, wherein the tire rubber includes a metallic alloy.

5. The method of claim 1 wherein the asphalt compound has a penetration of 0 dmm to 200 dmm.

6. The method of claim 1 wherein the asphalt compound is received by a wetting tank, the tire rubber is added to the asphalt compound in the wetting tank, and the wetting tank is heated to approximately 320° F. to 420° F.; and
   the tire rubber asphalt compound is generated in a reaction vessel heated to approximately 525° F. to 700° F.

7. The method of claim 1 wherein the asphalt compound and the tire rubber are received by a reaction vessel that is heated; and
   the tire rubber asphalt compound is generated in the reaction vessel.

8. A method for generating a tire rubber medium comprising:
   receiving an oil compound;
   heating the oil compound to approximately 320° F. to 420° F.;
   adding a tire rubber to the oil compound;
   generating the tire rubber medium by mixing the oil compound and the tire rubber for 60 minutes to 360 minutes, wherein the oil compound and the tire rubber are heated to approximately 525° F. to 700° F. during mixing, and wherein there is little or no oxidation of the oil compound, the tire rubber, and the tire rubber medium; and
   cooling the tire rubber medium.

9. The method of claim 8 further comprising applying a neutral gas when generating the tire rubber medium.

10. The method of claim 8 further comprising cooling the tire rubber medium to 500° F. to 350° F.

11. The method of claim 8 further including separating the tire rubber medium from a metallic alloy, wherein the tire rubber includes a metallic alloy.

12. The method of claim 8 wherein the oil compound and the tire rubber are received by a wetting tank that is heated to approximately 320° F. to 420° F.; and
   the tire rubber medium is generated in a reaction vessel heated to approximately 525° F. to 700° F.

13. The method of claim 8 wherein the oil compound and the tire rubber are received by a reaction vessel that is heated to approximately 320° F. to 420° F.; and
   the tire rubber medium is generated in the reaction vessel heated to approximately 525° F. to 700° F.

14. A system for generating a tire rubber asphalt compound, the system comprising:
   a wetting tank that receives an asphalt compound;
   a tire rubber that is received by the wetting tank;
   wherein the tire rubber and the asphalt compound are heated to 320° F. to 420° F. in the wetting tank to generate a wetting tank mixture;
   a reaction vessel that receives the wetting tank mixture and heats the wetting tank mixture to approximately 525° F. to 700° F. for 60 minutes to 360 minutes to generate the tire rubber asphalt compound; and
   wherein there is little or no oxidation in the reaction vessel.

15. The system of claim 14 wherein the reaction vessel cools the tire rubber asphalt compound to 500° F. to 350° F.

16. The system of claim 14 further comprising a separator that separates the tire rubber asphalt compound from a metallic alloy when the tire rubber includes a metallic alloy.

17. The system of claim 14 further comprising a neutral gas that is applied to the reaction vessel when generating the tire rubber asphalt compound.

18. A system for generating a tire rubber medium, the system comprising:
- a reaction vessel that receives an oil compound;
- a tire rubber that is received by the reaction vessel;
- wherein the tire rubber and the oil compound are heated to 320° F. to 420° F. in the reaction vessel;
- wherein the reaction vessel heats the tire rubber and the oil to approximately 525° F. to 700° F. for 60 minutes to 360 minutes to generate the tire rubber medium; and
- wherein there is little or no oxidation in the reaction vessel.

19. The system of claim 18 wherein the reaction vessel cools the tire rubber medium to 500° F. to 350° F.

20. The system of claim 18 further comprising a separator that separates the tire rubber medium from a metallic alloy when the tire rubber includes a metallic alloy.

21. The method of claim 18 further comprising a neutral gas that is applied to the reaction vessel when generating the tire rubber medium.

\* \* \* \* \*